(12) United States Patent
Nelson et al.

(10) Patent No.: US 7,655,152 B2
(45) Date of Patent: Feb. 2, 2010

(54) ETCHING

(75) Inventors: Curt Nelson, Corvallis, OR (US); Greg Long, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 934 days.

(21) Appl. No.: 10/832,640

(22) Filed: Apr. 26, 2004

(65) Prior Publication Data

US 2005/0236379 A1    Oct. 27, 2005

(51) Int. Cl.
  B44C 1/22    (2006.01)
  C03C 15/00   (2006.01)
  C03C 25/68   (2006.01)
  C23F 1/00    (2006.01)

(52) U.S. Cl. ............... 216/63; 216/62; 216/65; 219/121.69; 219/121.66; 219/121.68; 438/487

(58) Field of Classification Search .......... 216/62, 216/63, 65; 219/121.69, 121.66, 121.68; 438/487

See application file for complete search history.

(56) References Cited

U.S. PATENT DOCUMENTS

| | | | |
|---|---|---|---|
| 4,780,177 A | 10/1988 | Wojnarowski et al. | |
| 4,786,358 A * | 11/1988 | Yamazaki et al. | 216/48 |
| 4,834,834 A | 5/1989 | Ehrlich | |
| 4,842,677 A | 6/1989 | Wojnarowski et al. | |
| 4,877,480 A | 10/1989 | Das | |
| 4,877,939 A | 10/1989 | Duley | |
| 4,925,523 A | 5/1990 | Braren et al. | |
| 4,961,052 A | 10/1990 | Tada | |
| 5,024,724 A | 6/1991 | Hirono | |
| 5,221,422 A | 6/1993 | Das et al. | |
| 5,221,426 A | 6/1993 | Tessier et al. | |
| 5,260,235 A | 11/1993 | Dooley et al. | |
| 5,364,493 A | 11/1994 | Hunter, Jr. et al. | |
| 5,446,245 A | 8/1995 | Iwayama et al. | |
| 5,509,556 A * | 4/1996 | Balz et al. | 216/56 |
| 5,514,618 A | 5/1996 | Hunter, Jr. et al. | |
| 5,580,473 A | 12/1996 | Shinohara | |
| 5,679,967 A | 10/1997 | Janai et al. | |
| 5,723,843 A | 3/1998 | Muggli | |
| 5,741,431 A | 4/1998 | Shih | |
| 5,840,622 A | 11/1998 | Miles et al. | |
| 5,843,363 A * | 12/1998 | Mitwalsky et al. | 264/400 |
| 5,874,011 A | 2/1999 | Ehrlich | |
| 5,958,268 A * | 9/1999 | Engelsberg et al. | 219/121.84 |
| 6,025,256 A | 2/2000 | Swenson et al. | |

(Continued)

FOREIGN PATENT DOCUMENTS

EP    1 067 593    1/2001

OTHER PUBLICATIONS

J. Bonse et al., Femtosecond laser ablation of silicon-modification thresholds and morphology, Applied Physics A 74, 19-25 (2002).*

Uzi Landman et al., Molecular dynamics simulation of epitaxial crystal growth from the melt. I. Si(100), Physical Review B. 37, 9, 4637-4646, (1988).*

Bonse et al. (Applied Physics A. Materials Science and Processing, 74, 19-20 (2002)).*

(Continued)

Primary Examiner—Nadine G Norton
Assistant Examiner—Mahmoud Dahimene

(57) ABSTRACT

An etching method includes applying a first electromagnetic radiation to an area of structure, thereby altering a characteristic of the structure in the area, and applying a second electromagnetic radiation to the structure, the second electromagnetic radiation configured to selectively ablate the structure based on the characteristic.

15 Claims, 3 Drawing Sheets

U.S. PATENT DOCUMENTS 6,588,340 B2 7/2003 Friedman
6,617,541 B1 9/2003 Wadman
2002/0017116 A1 2/2002 Koyama

OTHER PUBLICATIONS

Uzi Landman et al. (Physical Review B, vol. 37, No. 9, Mar. 15, 1988).*

* cited by examiner

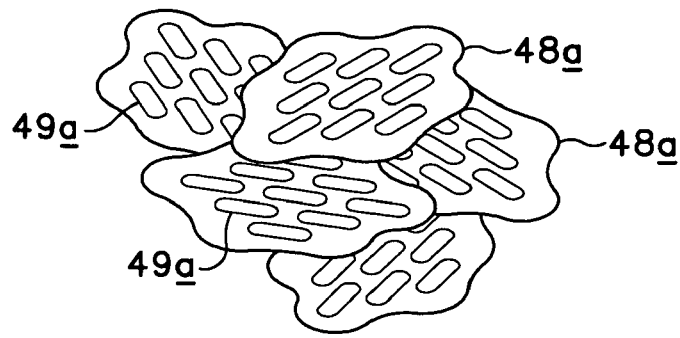
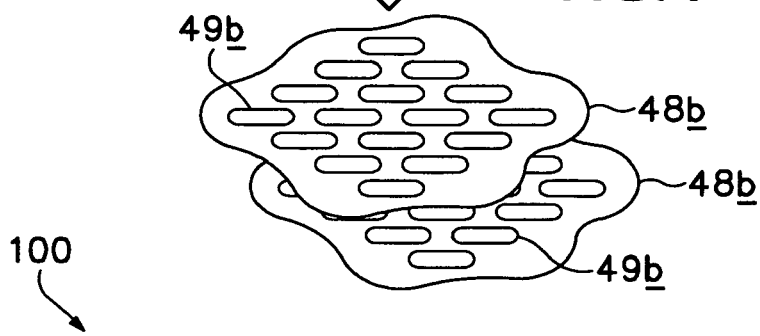

FIG.4

```
100
  ↓
┌─────────────────────────────────┐
│ PLACE MASK TO SHIELD            │──102
│ NON-TARGET AREA OF STRUCTURE    │
└─────────────────────────────────┘
              ↓
┌─────────────────────────────────┐
│ APPLY UV LASER BEAM TO          │──104
│ TARGET AREA OF STRUCTURE        │
└─────────────────────────────────┘
              ↓
┌─────────────────────────────────┐
│ MELT SURFACE LAYER IN           │──106
│ TARGET AREA OF STRUCTURE        │
└─────────────────────────────────┘
              ↓
┌─────────────────────────────────┐
│ ALLOW MELTED SURFACE LAYER TO   │
│ RECRYSTALLIZE TO DEFINE A       │──108
│ SURFACE LAYER WITH A DIFFERENTIAL│
│ SURFACE CHARACTERISTIC          │
└─────────────────────────────────┘
              ↓
┌─────────────────────────────────┐
│ APPLY YAG LASER BEAM            │──110
│ TO SURFACE LAYER                │
└─────────────────────────────────┘
              ↓
┌─────────────────────────────────┐
│ SELECTIVELY ABLATE RECRYSTALLIZED│
│ SURFACE LAYER BASED ON DIFFERENTIAL│──112
│ SURFACE CHARACTERISTIC          │
└─────────────────────────────────┘
```

FIG.5

ETCHING

BACKGROUND

Etching is the process of removing material from selected areas. The etching process may be used for several applications. For example, etching may be used in precise patterning of traces and other intricate features on electronic devices. Those patterned traces, among other things, allow electronic devices to work.

In the past, etching has been accomplished using wet etching or dry etching techniques. Both wet and dry etching techniques, however, may involve complicated machinery and chemical storage, handling, and disposal problems. Additionally, some of those techniques may excessively undercut the area being etched leading to less than precise etching.

BRIEF DESCRIPTION OF THE DRAWINGS

FIG. 4 is a schematic diagram illustrating a change of crystallinity and order state of a material upon melting the material and recrystallizing the material according to one embodiment.

FIG. 5 is a flowchart illustrating an embodiment of a selective etching method according to an embodiment of the invention.

DETAILED DESCRIPTION

Figure 1:
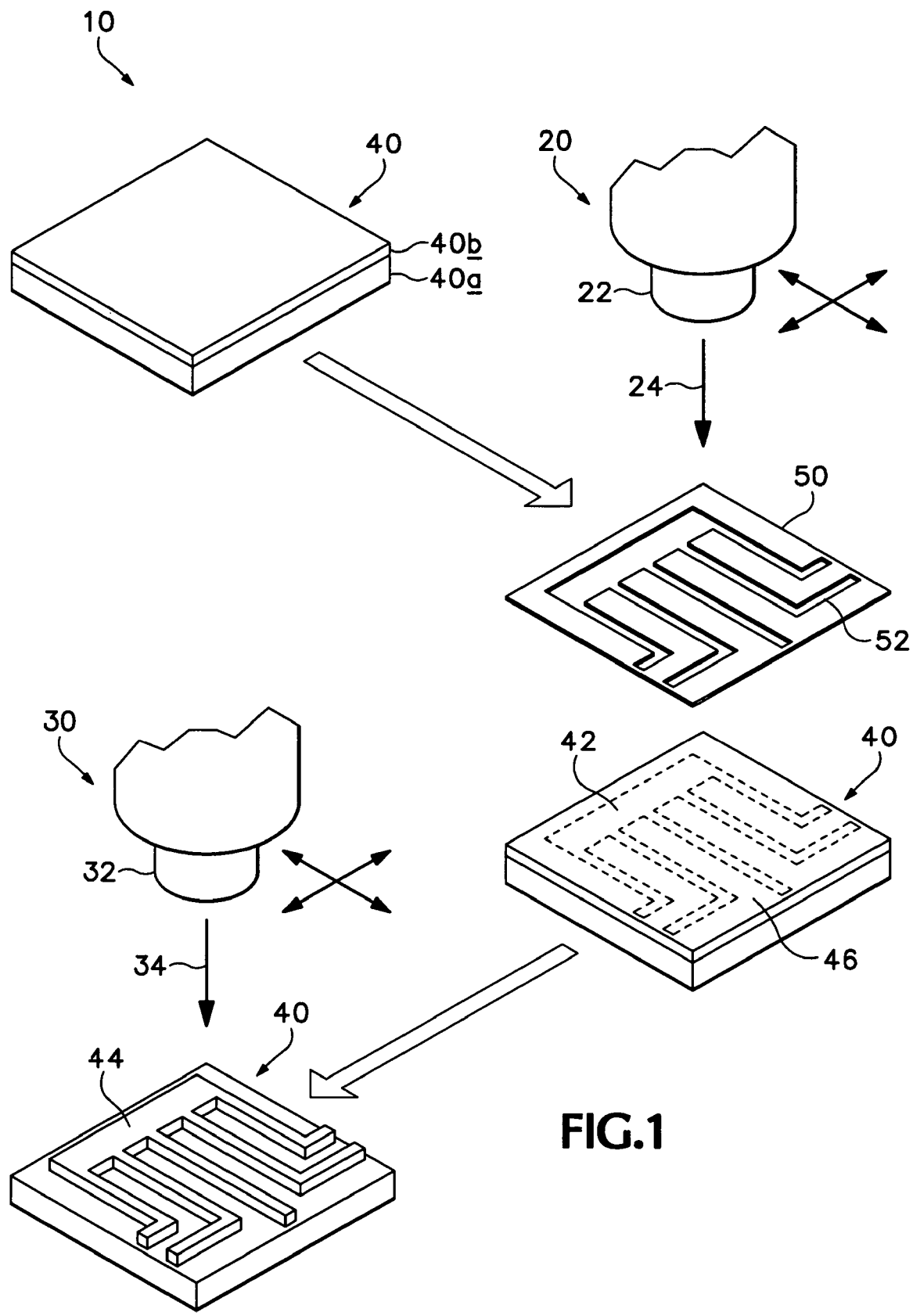
FIG. 1 is a schematic view illustrating operation of an embodiment of a selective etching system, according to an embodiment of the invention.

Referring initially to FIG. 1, an embodiment of a selective etching system is shown schematically at 10, the system including a first electromagnetic radiation system 20 and a second electromagnetic radiation system 30. Although two distinct electromagnetic radiation systems are shown, it will be appreciated that the depicted electromagnetic radiation systems are intended to illustrate different electromagnetic radiation operations, whether or not different systems are employed. Through the indicated electromagnetic radiation operations, a characteristic of structure 40 may be altered in an area, such as target area 42, of the structure, and the structure may be selectively ablated based on that characteristic.

As indicated, selective etching system 10 may be employed to define a trace on structure 40, such as that shown at 44 in FIG. 1. Structure 40 may be formed of virtually any material or combination of materials that may be altered chemically and/or physically by selective etching system 10. For example, structure 40 may take the form of a silicon substrate 40a, having a surface layer 40b. Such a structure may be etched to define precise traces and other intricate features, which may be used for electrical connections in electronic devices.

Surface layer 40b may be defined by a thin film overlying structure 40 or may be formed integrally with that structure. The depth of surface layer 40b may correspond to the desired depth of etching by selective etching system 10 and may be formed with a characteristic alterable upon application of electromagnetic radiation from one or more electromagnetic radiation systems.

It will be appreciated that although the exemplary surface layer is described as being formed of amorphous silicon, the surface layer may be formed of virtually any material configurable for selected ablation based on a characteristic alterable by application of electromagnetic radiation. The surface layer may be composed of the same material as structure 40 or may be composed of a different material than that structure. For example, structure 40 may be a silicon substrate and surface layer 40b may be a thin film of amorphous silicon. The amorphous silicon surface layer may have a thickness of 25 to 400 nanometers, which corresponds to the desired depth of etching.

As indicated, a mask 50 may be introduced between first electromagnetic radiation system 20 and structure 40, the mask defining a pattern 52 corresponding to a desired etch. Upon applying electromagnetic radiation, such as via laser beam 24 in FIG. 1, the mask may shield a non-target area 46 on the structure but allow application of the electromagnetic radiation to target area 42 on the structure. As shown, target area 42 generally corresponds to pattern 52 of mask 50. The pattern thus may be projected onto surface layer 40b of structure 40 to define a desired etch on the surface layer by scanning laser beam 24 across mask 50.

Figure 2:
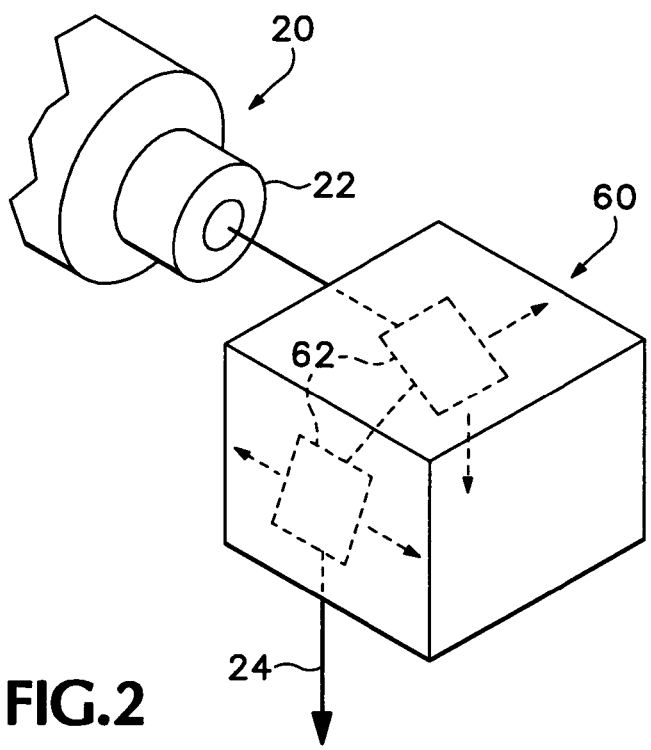
FIG. 2 is a schematic view illustrating operation of an embodiment of an electromagnetic radiation system forming a part of an embodiment of a selective etching system constructed in accordance with another embodiment of the invention.

Alternatively, or additionally, a galvo head system 60 may be placed between first electromagnetic radiation system 20 and structure 40, to selectively direct first electromagnetic radiation to the structure. Upon applying electromagnetic radiation, such as via laser beam 24 in FIG. 2, the galvo head system may, by employing one or more reflectors 62, direct the application of the electromagnetic radiation to target area 42 without the application of electromagnetic radiation to non-target area 46. Galvo head system 60 may include various componentry to selectively move reflectors 62, which may include servo motors and control software (not shown).

Figure 3:
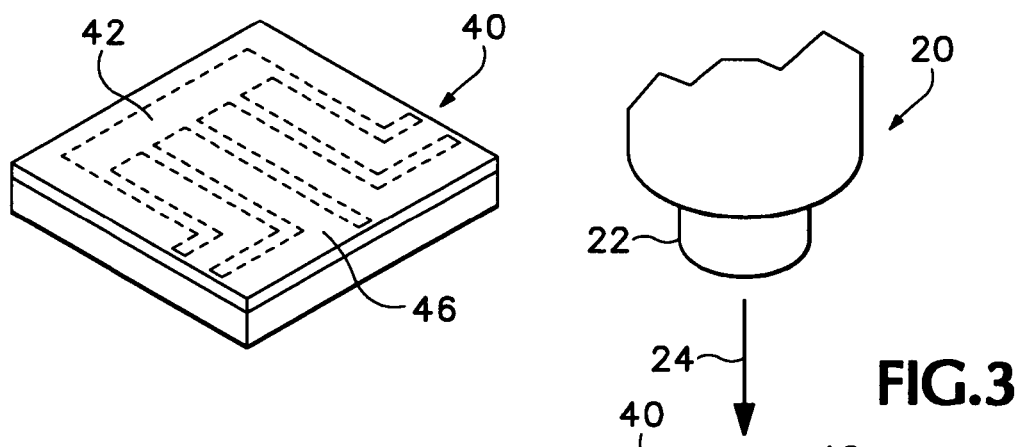
FIG. 3 is a schematic view illustrating operation of the embodiment of the first electromagnetic radiation system forming a part of an embodiment of a selective etching system constructed in accordance with yet another embodiment of the invention.
Figure 3:
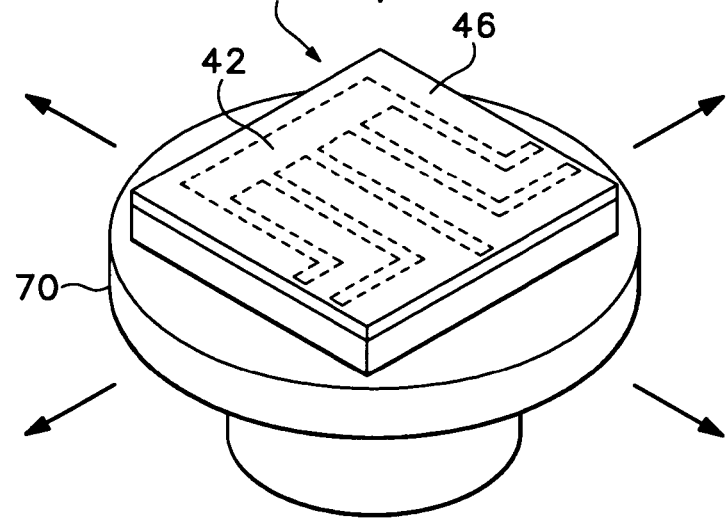

As indicated in FIG. 3, structure 40 may, alternatively or additionally, be located on a stage 70 to allow the structure to be moved thereby selectively directing first electromagnetic radiation to structure 40. Upon applying electromagnetic radiation, such as via laser beam 24 in FIG. 3, the stage may move structure 40 to direct the application of the electromagnetic radiation to target area 42 without the application of that radiation to non-target area 46. Stage 70 may include various componentry to selectively move structure 40, which may include any suitable motor and control software (not shown). It will be appreciated that although an exemplary galvo head system and stage are described, the disclosure includes virtually any system or device configured to selectively direct first electromagnetic radiation to target area 42 by redirecting the first electromagnetic radiation and/or moving the structure.

In accordance with the present teachings, surface layer 40b may have one or more characteristics that are altered upon application of selected electromagnetic radiation. Such characteristic may include virtually any suitable chemical, physical, or other property. One such alterable characteristic is crystallinity (or order state).

Crystallinity, as used herein, refers to the size of crystals in structure 40. Order state, as used herein, refers to the state of arrangement of atoms, ions, molecules and/or particles of structure 40, and may range from a generally random, less-ordered state to a generally predictable, more-ordered state. Accordingly, as will be described further below, upon application of laser beam 24 to target area 42 of structure 40, crystallinity (or order state) of the structure in the target area may be altered relative to the crystallinity (or order state) of structure in the non-target area shielded by mask 50.

First electromagnetic radiation system 20 may be configured to direct electromagnetic radiation at target area 42 of structure 40 to alter the crystallinity (or order state) in that area. The first electromagnetic radiation system may provide virtually any form of electromagnetic radiation. As shown in FIG. 1, first electromagnetic radiation system 20 may include a first laser 22 configured to direct laser beam 24 with photons (continuously or in laser beam pulses) at target area 42. The first laser may take the form of virtually any gas, liquid or solid-state laser, or any other source, configured to change crystallinity and/or order state of target area 42 of structure 40.

First laser 22 may be an ultraviolet (UV) laser that provides a homogenized excimer laser beam configured to change crystallinity and/or order state of target area 42 of structure 40. UV laser, as used herein, refers to a laser that provides a laser beam in the ultraviolet wavelength range of approximately 100 to 400 nanometers. Other types of lasers may be used that provide a laser beam in different wavelength ranges. Typically, where structure 40 is formed of silicon as described above, first laser 22 provides a laser beam in the wavelength range of 200 to 850 nanometers to change crystallinity and/or order state of target area 42 of structure 40.

The fluence, pulse length, and/or other suitable operational parameters of first laser 22 may be adjusted to achieve the desired change of crystallinity and/or order state of target area 42 of structure 40. Fluence, as used herein, refers to the number of photons per unit area, per unit time. Pulse length or pulse duration, as used herein, refers to the lifetime of the laser beam pulse expressed in units of time. Typically, the fluence, pulse length, and/or other suitable operational parameters of first laser 22 are chosen to be sufficient to achieve the desired change of crystallinity and/or order state of target area 42 but insufficient to ablate that area. For example, first laser 22 may be configured to have a fluence of 300 to 700 millijoules per square centimeter (mJ/cm$^2$), and a pulse length of 5 to 50 nanoseconds to melt the surface layer of structure formed of silicon such as that described above. Upon being melted, the surface layer may be allowed to recrystallize into the desired crystallinity and/or order state.

Second electromagnetic radiation system 30 may be configured to direct electromagnetic radiation at structure 40 and selectively ablate the surface layer of that structure based on the difference in crystallinity (or order state) between target area 42 and non-target area 46. The second electromagnetic radiation system may provide virtually any form of electromagnetic radiation. In FIG. 1, for example, second electromagnetic radiation system 30 may include a second laser 32 configured to direct a laser beam 34 with photons (continuously or in laser beam pulses) at surface layer 40b of structure 40. The second laser may take the form of virtually any gas, liquid, and/or solid-state laser, or any other source, configured to selectively ablate surface layer 40b that layer based on differences in crystallinity and/or order state.

Second laser 32 may be a neodymium: yttrium-aluminum garnet (YAG) laser configured to selectively ablate surface layer 40b of structure 40 based on differences in crystallinity and/or order state. YAG laser, as used herein, refers to a solid-state laser that uses yttrium aluminum garnet doped with neodymium as the matrix material. Other types of lasers may be used that provide a laser beam in different wavelength ranges, such as lasers that provide a laser beam in the wavelength range of 300 to 750 nanometers to selectively ablate the surface layer.

The fluence, pulse length, and/or other suitable operational parameters of second laser 32 also may be adjusted to ablate the surface layer in non-target area 46, but not ablate the surface layer in target area 42 (or vice versa). Where the surface layer is formed of silicon, as described above, second laser 46 may be adjusted to have a fluence of 500 to 2500 mJ/cm$^2$, and a pulse length of 5 to 50 nanoseconds to ablate non-target area 46 of structure 40. A trace 44 thus may be left on structure 40, as shown in FIG. 1.

It will be appreciated that although exemplary electromagnetic radiation systems are described as including lasers, the systems may include any form of electromagnetic radiation source configurable for altering one or more characteristics of target area 42 of structure 40 and/or selectively ablating structure 40 based on those altered characteristics. The systems may be composed of the same type of electromagnetic radiation source or may be composed of different types of electromagnetic radiation sources.

The effects first laser 22 may have on target area 42 are schematically illustrated in FIG. 4. In some embodiments, surface layer 40b of structure 40 may be formed of relatively small crystals 48a before melting by first laser 22. After allowing the melted surface layer to recrystallize, that layer in target area 42 may be formed of relatively large crystals 48b. Similarly, first laser 22 may effect a transformation of the surface layer in target area 42 from a generally random, less-ordered state 49a to a generally predictable, more-ordered state 49b. Although only increases of crystal size and order state are illustrated, the scope of the disclosure includes first laser 22 having the effect of decreasing crystal size and/or order state.

The change of crystallinity and/or order state may allow second laser 32 to selectively ablate non-target area 46 (or target area 42) based on the difference of characteristics between target and non-target areas. For example, increasing crystal size in target area 42 may make target area 42 more resistant to laser ablation. Thus, the fluence and/or other suitable operational parameters of second laser 32 may be chosen to be sufficient to ablate non-target area 46 but not sufficient to ablate target area 42. It will be appreciated that although the effects of the first laser are illustrated only in connection with crystallinity and order state, the scope of the disclosure may includes other effects the first laser.

FIG. 5 is a flowchart 100 illustrating an embodiment of a selective etching method according to an embodiment of the invention. At 102, a first electromagnetic radiation system is configured such that electromagnetic radiation is applied only to a target area. In an exemplary embodiment, a mask is used to shield a non-target area 46. At 104, electromagnetic radiation from a first electromagnetic radiation system is applied to the target area 42 of structure. For example, a UV laser beam may be applied to the target area of the structure. At 106, one or more characteristics of surface layer in the target area of the structure are changed by application of the electromagnetic radiation. Accordingly, the surface layer in the target area of the structure may be melted by the application of electromagnetic radiation.

At 108, the one or more characteristics that were changed by application of electromagnetic radiation are allowed to stabilize resulting in a surface layer with a differential surface characteristic. In particular, a melted surface layer may be allowed to recrystallize to define a surface layer with a differential surface characteristic. At 110, electromagnetic radiation from a second electromagnetic radiation system may be applied to the surface layer. For example, a YAG laser beam may be applied to the surface layer. At 112, the surface layer may be selectively ablated by the second electromagnetic radiation system based on the differential surface characteristic. Accordingly, the recrystallized surface layer may be selectively ablated by the YAG laser beam based on differential surface characteristic.

Although the present embodiments have been shown and described, it will be apparent to those skilled in the art that various changes in form and detail may be made without departing from the spirit and scope defined in the appended claims. The present disclosure is intended to embrace all such alternatives, modifications, and variances. Where the disclosure or claims recite "a," "a first," or "another" element, or the equivalent thereof, they should be interpreted to include one or more such elements, neither requiring nor excluding two or more such elements.

What is claimed is:

1. An etching method, comprising:
   applying a first electromagnetic radiation to an area of a structure, thereby altering a characteristic of the structure in the area, wherein the area is a subset of the structure; and
   applying a second electromagnetic radiation to the structure, the second electromagnetic radiation configured to selectively ablate the structure based on the characteristic of the structure, wherein the second electromagnetic radiation ablates the structure where the characteristic is unaltered.

2. A selective etching method, comprising:
   applying a first laser to a target area of a structure, thereby altering a characteristic of the structure in the target area, wherein the target area is a subset of the structure; and
   applying a second laser to the structure, the second laser configured to selectively ablate the structure based on the characteristic, wherein the second laser ablates the structure where the characteristic is unaltered.

3. A selective etching method, comprising:
   exposing a target area of a structure to a first laser, thereby altering a surface characteristic of the structure in the target area; and
   exposing the structure to a second laser configured to ablate a surface layer of the structure only where the surface characteristic is unaltered.

4. The selective etching method of claim 3, where exposing the target area of the structure to the first laser includes placing a mask intermediate the first laser and the structure, the mask configured to shield a non-target area of the structure from the first laser.

5. The selective etching method of claim 3, includes placing a galvo head system intermediate the first laser and the structure, the galvo head system configured to direct the first laser to the target area of the structure.

6. The selective etching method of claim 3, includes moving a stage where the structure is located to direct the first laser to the target area of the structure.

7. The selective etching method of claim 3, where the first laser is a UV laser and the second laser is a YAG laser.

8. The selective etching method of claim 3, where the surface layer is initially formed of substantially amorphous silicon.

9. The selective etching method of claim 8, where the first laser has a fluence of approximately 300 mJ/cm$^2$ to approximately 700 mJ/cm$^2$, and a wavelength of approximately 200 nanometers to approximately 850 nanometers.

10. The selective etching method of claim 9, where the second laser has a fluence of approximately 500 mJ/cm$^2$ to approximately 2500 mJ/cm$^2$, and a wavelength of approximately 300 nanometers to approximately 750 nanometers.

11. The selective etching method of claim 10, where applying the first laser includes applying a first laser beam in one or more pulses having a pulse length of 5 nanoseconds to approximately 50 nanoseconds, and applying the second laser includes applying a second laser beam in one or more pulses having a pulse length of approximately 5 nanoseconds to approximately 50 nanoseconds.

12. The selective etching method of claim 10, where the first laser is a UV laser, and the second laser is a YAG laser.

13. The selective etching method of claim 3, where the surface characteristic is crystallinity.

14. The selective etching method of claim 3, where applying the first laser includes melting the target area, and allowing the target area to recrystallize.

15. A selective etching method, comprising:
    applying a first laser beam to a target area of a structure, the first laser beam selected to alter a surface characteristic in the target area; and
    applying a second laser beam to the structure, the second laser beam configured to selectively ablate a surface layer of the structure based on whether the surface characteristic has been altered, where the second laser beam ablates the surface aver of the structure where the surface characteristic is unaltered.

* * * * *

UNITED STATES PATENT AND TRADEMARK OFFICE
CERTIFICATE OF CORRECTION

PATENT NO. : 7,655,152 B2  Page 1 of 1
APPLICATION NO. : 10/832640
DATED : February 2, 2010
INVENTOR(S) : Curt Nelson et al.

It is certified that error appears in the above-identified patent and that said Letters Patent is hereby corrected as shown below:

In column 6, line 46, in Claim 15, delete "aver" and insert -- layer --, therefor.

Signed and Sealed this

Eighteenth Day of May, 2010

David J. Kappos
*Director of the United States Patent and Trademark Office*